Nov. 2, 1943.   G. A. EDDY   2,333,162
FOLDING REPRESENTATION OF GLOBES
Filed March 10, 1942
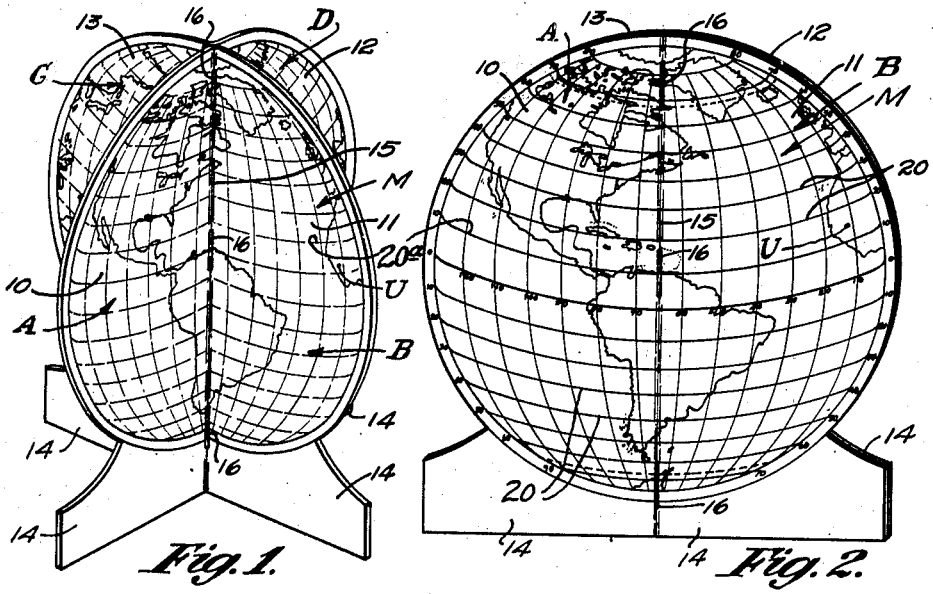
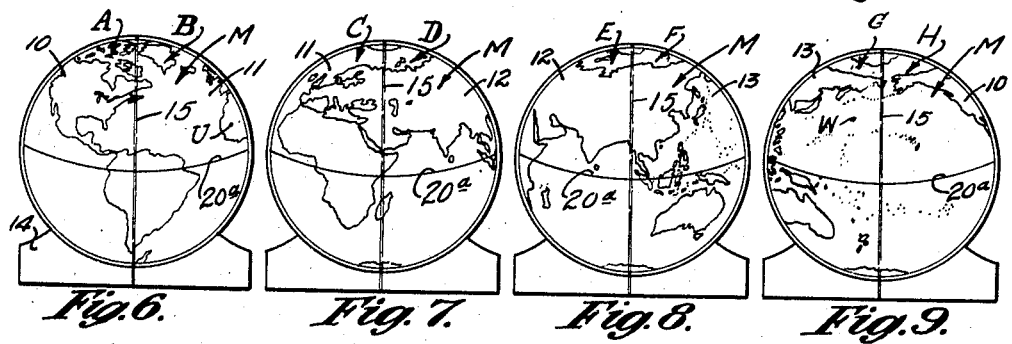
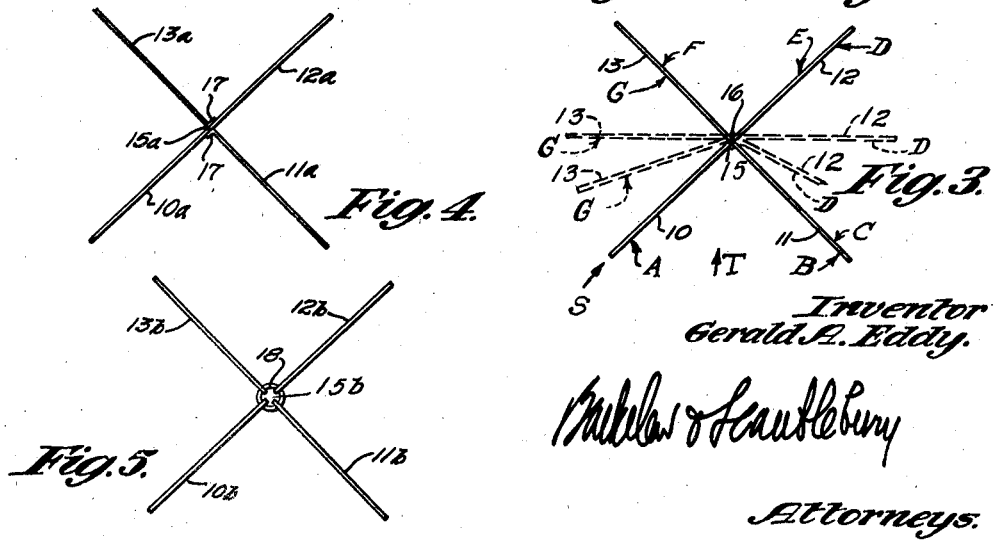
Inventor
Gerald A. Eddy.
Attorneys.

Patented Nov. 2, 1943

2,333,162

UNITED STATES PATENT OFFICE 2,333,162

FOLDING REPRESENTATION OF A GLOBE

Gerald A. Eddy, Glendale, Calif., assignor of one-half to Fritz B. Burns

Application March 10, 1942, Serial No. 434,035

9 Claims. (Cl. 35—46)

The present invention deals with a "folding representation of a globe," the object of the invention being the provision of a very simple and inexpensive folding leaf device designed to take the place for certain uses of the more expensive conventional globe.

The device provided by the invention comprises three or more semi-circular leaves, hinged together centrally, and each provided with a foot, whereby the device will stand on a table when unfolded, or will assume a flat folded condition. The circular area formed by the two adjacent surfaces of each pair of contiguous semi-circular leaves bears a map. Assuming four leaves as typical, there will be four such circular areas, and each will bear a map showing preferably somewhat more than one-fourth of the world's surface, the maps on the four circular areas together showing the whole, preferably with some overlap between adjacent areas, and the maps on successive circular areas being arranged in natural succession about the world. The maps on successive circular areas of the device thus show successive sections (with some overlap) of an entire world map, and by turning the leaves in either direction, a series of maps appear in succession, progressing longitudinally around the world, and closing finally with the first map viewed.

The invention will be better understood from the following detailed description of certain present illustrative embodiments thereof, reference for this purpose being had to the accompanying drawing, in which:

Fig. 1 is a perspective view of a device in accordance with the invention, the device being in unfolded condition;

Fig. 2 is a perspective view of the device of Fig. 1, but in flat folded condition;

Fig. 3 is a plan view of the device shown in Fig. 1;

Fig. 4 is a view similar to Fig. 3, but showing a modification;

Fig. 5 is another view similar to Fig. 3, showing a further modification; and

Figs. 6-9 show a typical distribution of a world map among the four circular map areas provided by the form of device shown in Figs. 1-5.

The embodiment of the invention shown in Figs. 1 to 3 comprises four semi-circular leaves 10, 11, 12 and 13, formed of heavy paper, cardboard or the like, each bearing on each of its surfaces one-half of a full circular map M, as presently to be described in more detail. Each of these leaves is provided with an integral, suitably formed foot 14 adapted to rest on a horizontal surface, and the four leaves are joined together centrally along a vertical diametrical hinge line or axis 15 allowed them to be opened out as shown in Fig. 1 or to be folded in flat arrangement as shown in Fig. 2. The leaves may thus be considered as extending radially from axis 15. The device being in the unfolded condition of Fig. 1, the four feet 14 form a cross enabling the device to straight upright, as will be understood.

The hinge between the several semi-circular leaves may be of any suitable character, suitable forms of which are shown in Figs. 3, 4 and 5. In accordance with the form of Figs. 1 to 3, one pair of the leaves, as for instance pair 10, 11, is composed of one fully circular piece with a vertical diametrical crease hinge, the other pair of leaves 12, 13 is composed of another fully circular piece with a vertical diametrical crease hinge, and the two pieces are hingedly connected by means of conventional wire staples 16.

In Fig. 4, one pair of semi-circular leaves 10a, 12a is composed of one fully circular piece with a vertical diametrical crease hinge at 15a, and the other two semi-circular leaves 11a and 13a are provided along their diametrical edges with hinge tabs 17 attached to opposite sides of the one piece 10a, 12a.

In Fig. 5, the four semi-circular leaves 10b, 11b, 12b and 13b are formed as four separate pieces, their diametrical edges being hingedly connected by means of hinge rings 18.

Though I prefer to employ four leaves, as illustrated, it will be evident that any number of leaves can be employed except two, at least three leaves being necessary to enable the device to stand upright when unfolded. Assuming four leaves, however, the mapping is so arranged that each full circular map area, formed by the opposing semi-circular surfaces of two contiguous semi-circular leaves, has printed or otherwise depicted thereon a full circular map M showing somewhat more than one-fourth of the world's surface, the entire world map being divided between the four such full circular areas provided, with some overlap between adjacent areas. This overlap, as well as the main distribution of the world map among the four map areas, is preferably such as will not unduly break up the main political and geographical divisions of the earth. For instance, each of the four circular map areas may show slightly more than one-third of the full world map, with the whole of the American continents and the Atlantic Ocean area appearing on one full circular map area, the whole of Europe, Africa, and the larger part of Asia appearing on the next such area "East," the whole of Asia with parts of the Eastern Pacific and of Europe and Asia on the next area in succession in the "Easterly" direction, and the whole of the Pacific area with a part of Asia on the remaining area. This typical distribution is indicated in the diagrams of Figs. 6-9.

The maps preferably, though not necessarily, substantially completely fill the circular map areas, giving to each circular map area somewhat the simulated appearance of a face of a globe. And preferably, each of the maps is drawn with its latitude lines 20 curved downwardly so as to give to some extent the natural impression of looking somewhat downwardly on a conventional globe, and also so as to somewhat enlarge and emphasize the northern hemisphere of the globe. The axis 15 may be considered as representing a longitude line in connection with each map section.

The simplicity, inexpensiveness and utility of the device will be fully evident. The leaves may be folded flat (as in Fig. 2) and laid on a table with any one of the full circle map areas uppermost for close inspection or study, and the device is also folded in this flat condition when put away, or for shipment or mailing purposes. Alternatively, it may be unfolded and stood up on a table, like a globe, which it further resembles in that it shows the world map as circularly closed in latitude, and, by turning the device (or its leaves) in either direction, successive areas of the world map, taken in a longitudinal direction about the world, are successively brought to view, with a return finally to the first map area viewed.

For convenience of reference, it will be noted that map sections A and H are on opposite sides of leaf 10; sections B and C are on opposite sides of leaf 11; sections D and E are on opposite sides of leaf 12; and sections F and G are on opposite sides of leaf 13. In the embodiment shown in Figs. 1, 2 and 3, leaves 10 and 11 are made up of a single sheet, as are also leaves 12 and 13, although this is not limitative on the broader aspects of the invention, as evidenced, for instance, by the modification of Figs. 4 and 5.

Since the device has been described as foldable and there is no structure limiting the relative positions of the leaves between the fully folded and fully extended conditions, it is obvious that, for instance, leaves 12 and 13 may be placed in co-planar relation, as indicated by dotted lines in Fig. 3 or in the relatively angular relation indicated by dot-dash lines in that figure; the device still being capable of standing erect as in Fig. 1. The same is true in connection with the modifications of Figs. 4 and 5.

The following discussion of the relationship between the map sections will be confined to the arrangement shown in Figs. 1 to 3, inclusive, and Figs. 6 to 9, inclusive, but it will be seen that the remarks will apply equally well to the modifications of Figs. 4 and 5 so far as general principles are concerned.

The map sections A and B are applied to the opposing faces of leaves 10 and 11 and represent, compositely, a geographical area of which axis 15 represents a common, central longitude line, the latitude lines 20 and all geographical data of the two sections meeting and matching at this axis. The same is true in the modifications of Figs. 4 and 5 except that in those figures the leaves 10a—11a and 10b—11b are not integral.

The map sections C and D are applied to opposing faces of leaves 11 and 12 and they, likewise, represent compositely a geographical area of which axis 15 represents the central longitude line, with the latitude lines 20 and all geographical data meeting and matching at this axis, one map section being a direct geographical extension of the other.

It will be seen that map sections B and C are on opposite sides of leaf 11 and that the latitude lines of these two sections, at the distal end of the leaf, match one another and, except for the specified mutual overlap of geographical data, one section represents a geographical extension of the other.

The relationships of map sections E—F and of G—H are the same as those described in connection with A—B and C—D, respectively, while the relationships of map sections D—E, F—G, and H—A are the same as those described in connection with B—C.

For the following consideration, it will be convenient to consider leaves D and G as turned into co-planar relation (dotted lines in Fig. 3) though the map-section relationship, to be outlined, will apply equally as well when the leaves are in any other relative position or when the two corresponding, but separately fabricated, leaves 12a—13a or 12b—13b of Figs. 4 and 5, respectively, are substituted for the integral leaves 12 and 13.

It will be seen that map sections D and G both meet at axis 15 and that their latitude lines will, in effect, match at this axis. However, viewing these sections from the position T and disregarding leaves 10 and 11, it will be seen that, in spite of the fact that they extend to common longitudinal line 15, they represent areas which are actually geographically separated in longitude. The intervening area is represented on map sections H—A—B—C, the section H laterally meeting and matching section G at axis 15 as a direct extension of the area represented thereon, section C laterally meeting and matching section D as a direct extension of the area represented thereon, and sections A and B filling the gap between sections H and C as has been set forth.

Map sections H and C may be considered similarly as representing areas which are actually geographically separated in longitude but depicted as meeting at the common longitude line 15 with the section latitude lines meeting and matching at 15 with the intervening areas represented on leaves 12 and 13.

The section pairs A—D and H—E may likewise each be considered as representing areas which are geographically separated in longitude but depicted as meeting at the common longitude line 15 with the section latitude lines and equator 20a meeting and matching at 15. However, in this consideration, the intervening and matching area between A and D is represented by the map sections B—C on the opposite sides of the single leaf 11, while the intervening and matching area between H and E is represented by the map sections F—G on the opposite sides of the single leaf 13. In these cases, the map sections B, C, F, G are direct and matching extensions, from axis or common longitude line 15, of the areas represented on sections A, D, E, H, respectively. In each and every case the latitude lines of the map sections match at the distal ends of the leaves, and, except for the mutual overlap described, they match in represented area.

With the described map-section arrangement, it will be seen that, in addition to the advantages spoken of at the outset, the following feature is presented. Assume that it be desired to directly compare the relative latitudes of places which are geographically spaced about 180°, the details of the intervening areas being of no significance in the comparison.

In order to do this with a spherical globe, it is necessary either to rotate the globe or to "follow" the latitude of the first-observed location around the globe to the second-observed location. Both locations cannot be observed without moving either the globe or the position of the observer.

In using an ordinary atlas, such a comparison cannot be made without turning pages and taking note of the pertinent data, unless the entire world map is on a single page or is continuously extended over a pair of facing pages.

On the other hand, such a comparison may be made with the present device without any of these difficulties. For instance, assume it be desired to compare the latitudes of Dakar, at U on map section B and Wake Island, at W on map section G, these locations being about 180° apart in longitude. With the device in the condition of Fig. 3, and with the observer in the position S, a single sweeping glance from one location to the other will show that they are at approximately the same latitude, and this knowledge has been gained without the necessity of reference to the numerical latitude indications and without traversing the intervening area represented on map sections A and H. In fact, the two locations, geographically spaced 180° apart, appear to the observer in position S to be only about 70° apart, and they can therefore be taken in by the eye without moving the device or the observer's position.

It will of course be understood that the drawing and description are for illustrative purposes only, and that various changes in design, structure and arrangement may be made without departing from the spirit and scope of the invention or of the appended claims.

I claim:

1. In a device of the character described, the combination of at least three flat leaves supported to extend radially outward from a common vertical axis and in angularly spaced relation, and a plurality of successive longitudinal sections of a map provided, one each, in successive and normal order on successive surfaces of the leaves, with the map sections on contiguous surfaces matching one another at said axis and the sections on the opposite sides of a given leaf matching one another in latitude at the distal end of the leaf.

2. In a device of the character described, the combination of at least three flat leaves supported to extend radially outward from a common vertical axis and in angularly spaced relation, and a plurality of successive longitudinal sections of a map provided, one each, in successive and normal order on successive surfaces of the leaves, with the map sections on contiguous surfaces matching one another at said axis and the sections on the opposite sides of a given leaf matching one another in latitude and showing mutually overlapping map continuations at the distal end of the leaf.

3. In a device of the character described, the combination of at least three leaves hingedly associated about a given axis for movement from positions of substantially planar parallelism and adjacency to positions of relative angularity, and at least four successive longitudinal sections of a map provided, one to a leaf-surface, in successive and normal order on successive surfaces of the leaves, two of the sections being on opposite sides of a given leaf, the map sections on contiguous surfaces matching one another at said axis, the map sections at the distal end of the given leaf matching one another in latitude.

4. In a device of the character described, the combination of a pair of map sections extending in a common plane, the sections depicting areas which are actually geographically separated in longitude but are represented as extending inwardly substantially to meet longitudinally at a given line and matching one another in latitude but not in area at that line, a leaf extending from said given line in a plane angularly disposed with respect to said common plane, and a map section on one side of said leaf which matches in latitude and depicts a direct extension of the area depicted on the adjacent one of the first mentioned map sections.

5. In a device of the character described, the combination of a pair of map sections extending in a common plane, the sections depicting areas which are actually geographically separated in longitude but are represented as extending inwardly substantially to meet longitudinally at a given line and matching one another in latitude but not in area at that line, a leaf extending from said given line in a plane angularly disposed with respect to said common plane, and a map section on one side of said leaf which matches in latitude and depicts a direct extension of the area depicted on the adjacent one of the first mentioned map sections, and a second leaf extending from said given line and in a plane angularly disposed with respect to both said common plane and the plane of the first mentioned leaf, there being a map section on one side of the second leaf which matches in latitude and depicts a direct extension of the area depicted on the other of the first mentioned map sections.

6. In a device of the character described, the combination of a pair of map sections extending in a common plane, the sections depicting areas which are actually geographically separated in longitude but are represented as extending inwardly substantially to meet longitudinally at a given line and matching one another in latitude but not in area at that line, a leaf extending from said given line in a plane angularly disposed with respect to said common plane, and a map section on one side of said leaf which matches in latitude and depicts a direct extension of the area depicted on the adjacent one of the first mentioned map sections, and a second leaf extending from said given line and in a plane angularly disposed with respect to both said common plane and the plane of the first mentioned leaf, there being a map section on one side of the second leaf which matches in latitude and depicts a direction extension of the area depicted on the other of the first mentioned map sections, the depictions on said one sides of said leaves representing areas which are geographically separated from one another in longitude, and a pair of map sections, one each on the opposite sides of each of the leaves, which match the other sections in latitude, and, compositely, depict the area geographically extending between the areas depicted on the said one sides of the leaves.

7. In a device of the character described, the combination of a pair of leaves supported to extend radially outward from a vertical axis and in angularly spaced relation, a pair of map sections one on each of the leaves, the sections being on corresponding sides of the leaves, the sections being matched in latitude at the axis and depicting areas which are actually geographically separated in longitude but are represented as extending inwardly to said axis, a third leaf extending from said axis and between the two first mentioned leaves, and a map section on one side of the third leaf which matches in latitude and depicts a direct extension of the area depicted on the adjacent one of the first mentioned map sections.

8. An educational device comprising two substantially circular like pieces of cardboard, a map of the earth disposed on said pieces having the polar regions thereof depicted adjacent the ends of the axis of said map pieces, each of said pieces being provided with a wing portion having a straight edge disposed at a right angle with respect to and extending from each side of the axis thereof adjacent the depictation of the south polar region, means for securing the axis portions of said pieces together to provide an approximately cruci-form configuration in plan, said edges being adapted to support said device vertically with respect to a horizontal surface, whereby a globular map is simulated.

9. A word map embodying therein a plurality of relatively stiff sheet-like members each having two faces, one face of each member having geographically non-contiguous map delineation sections thereon, said members being connected along their mid portions to provide outwardly extending wing-like parts, and whereby the sections of the map delineations on all the opposed faces of adjacent wing-like parts are disposed geographically contiguous and are readable in succession to provide the entire area of the world.

GERALD A. EDDY.